United States Patent [19]

Gopalakrishnan

[11] Patent Number: 5,699,179
[45] Date of Patent: Dec. 16, 1997

[54] CANCELLATION OF DISTORTION COMPONENTS IN A FIBER OPTIC LINK WITH FEED-FORWARD LINEARIZATION

[75] Inventor: Ganesh K. Gopalakrishnan, Huntingdon Valley, Pa.

[73] Assignee: General Instrument Corporation of Delaware, Chicago, Ill.

[21] Appl. No.: 605,989

[22] Filed: Feb. 23, 1996

[51] Int. Cl.[6] .................................................. H04B 10/04
[52] U.S. Cl. .......................... 359/183; 359/161; 359/181; 359/187; 359/239
[58] Field of Search ....................... 359/180–181, 359/183, 249, 187–188, 161, 239; 385/24

[56] References Cited

U.S. PATENT DOCUMENTS

| | | | |
|---|---|---|---|
| 5,166,821 | 11/1992 | Huber | 359/181 |
| 5,210,633 | 5/1993 | Trisno | 359/194 |
| 5,327,279 | 7/1994 | Farina et al. | 359/180 |
| 5,420,868 | 5/1995 | Chaplysy et al. | 359/181 |
| 5,515,199 | 5/1996 | Farina | 359/326 |
| 5,532,857 | 7/1996 | Gertel et al. | 359/181 |
| 5,617,239 | 4/1997 | Walker | 359/181 |

OTHER PUBLICATIONS

Product Brief, AT&T Microelectronics, "m2410C/m2420C Dual–Output Lithium Niobate Modulator," Feb. 1995.
Data Sheet, United Technologies Photonics, "APE Dual Output Modulator for CATV Transmitters, 1320 and 1550 nm," Feb. 1995.
C. Desem, "Composite second order distortion due to self-phase modulation in externally modulated optical AM–SCM systems operating at 1550 nm," Eletronics Letters, Nov. 24, 1994, pp. 2055–2056.
M.R. Phillips et al., "Nonlinear Distortion Generated by Dispersive Transmission of Chirped Intensity–Modulated Signals," IEEE Photonics Technology Letters, vol. 3, No. 5, May 1991, pp. 481–483.
J.D. Farna, "New Method for Electro–Optic Linearization of External Modulators," IEEE/LEOS 1995 Digest of the LEOS Summer Topical Meetings, Aug. 7–11, 1995, p.81.
F. Koyama et al., "Frequency Chirping in External Modulators," IEEE Journal of Lightwave Technology, vol. 6, No. 1, Jan. 1988, pp. 87–93.
A. Djupsjöbacka, "Residual Chirp in Integrated–Optic Modulators," IEEE Photonic Technology Letters, vol. 4, No. 1, Jan. 1992, pp. 41–43.

Primary Examiner—Leslie Pascal
Attorney, Agent, or Firm—Barry R. Lipsitz; Ralph F. Hoppin

[57] ABSTRACT

A phase modulator is provided in an externally modulated, feed-forward linearized, analog cable television (CATV) link for reducing fiber-induced composite second order (CSO) distortion components. The system is compatible with existing commercially available modulators. CSO distortion is caused, in part, by self-phase modulation of the transmitted signal in the fiber optic link. The problem is particularly prevalent when data is transmitted at a wavelength other than the minimum dispersion wavelength of the fiber. Moreover, CSO distortion increases with the length of the fiber optic link and with the optical intensity modulation index of the primary modulator of the link. The phase modulator modulates an optical signal which is provided to the primary modulator in accordance with an optical phase modulation index k of an RF data signal to be transmitted. The phase modulator is effective with fiber optic links of varying lengths which carry amplitude-modulated vestigial sideband (AM-VSB) data signals such as cable television (CATV) signals.

19 Claims, 5 Drawing Sheets

CANCELLATION OF DISTORTION COMPONENTS IN A FIBER OPTIC LINK WITH FEED-FORWARD LINEARIZATION

BACKGROUND OF THE INVENTION

The present invention relates to optical fiber communication systems, and more particularly to a technique to compensate for fiber-induced distortion in an externally modulated, feed-forward linearized, analog cable television (CATV) link.

Various communication systems, such as CATV systems, currently distribute information signals via coaxial cable. The replacement of coaxial cable with optical fiber transmission lines in such communications systems has become a high priority. Production single mode fiber can support very large bandwidths and has low attenuation. Accordingly, a fiber optic distribution system or a fibercoax cable hybrid would provide substantially increased performance at a competitive cost as compared to conventional coaxial cable systems.

In a CATV system, the information that is communicated is contained in a radio-frequency (RF) television signal. The use of a television signal comprising amplitude-modulated vestigial sideband (AM-VSB) subcarriers is preferred in the distribution of cable television signals due to the compatibility of that format with the standards of the National Television Standards Committee (NTSC), and the ability to provide an increased number of channels within a given bandwidth. AM-VSB transmission of television signals requires a carrier to noise ratio (CNR) of at least 40 dB, and preferably 60 dB, to provide clear reception.

Furthermore, the advent of commercially available rare earth fiber amplifiers, such as the Erbium-Doped Fiber Amplifier (EDFA), has led to the consideration of systems that transmit AM-VSB television signals at the optical wavelength of 1,550 nm, which is the wavelength at which EDFAs operate. However, most fiber links currently installed utilize fiber that has a minimum dispersion wavelength near 1,310 nm. In analog communication systems, transmission of a 1,550 nm signal in such a fiber link is sub-optimal due to fiber dispersion. Moreover, illumination of the fiber with large optical powers such as those available from an EDFA introduces self-phase modulation which, in conjunction with fiber dispersion, causes high levels of composite second order (CSO) dispersion. Distortion is also caused by the particular AM-VSB signal which is being transmitted from the transmitter side of the link. Additionally, external modulators, such as the Mach-Zehnder modulator, can exhibit residual chirping. This phenomenon, caused by asymmetric field overlap between the two arms of the Mach-Zehnder structure, can contribute to phase modulation of the transmitted light wave.

Furthermore, dispersion in an optical fiber may be of several varieties. Dielectric media such as optical fibers used to carry light are not totally transparent. For example, glass is approximately transparent in the visible region of the optical spectrum, but absorbs ultraviolet and infrared light. Propagation of light can be characterized by an absorption coefficient $\alpha$, and a propagation constant $\beta$. The intensity of the lightwave is thus attenuated with distance z according to the factor $e^{-\alpha z}$, and the phase changes with distance z according to the factor $\beta$.

Dispersion is characterized by a change in the susceptibility $\chi$, refractive index n, and speed of light c in the fiber as a function of wavelength $\lambda$ or frequency $\nu$ of the transmitted radiation. The susceptibility $\chi$ is related to the permittivity $\epsilon$ of the fiber according to $\epsilon=\epsilon_0(1+\chi)$, where $\epsilon_0$ is the permittivity of free space. The refractive index n is the ratio of the speed of light in free space $C_0$ to the speed of light in the fiber c, e.g., $n=C_0/C$.

A dispersive medium will therefore broaden a pulse of light since the different frequency components in the light will travel at different speeds. As a result, the pulse is carried over an increasingly wider time interval. Moreover, as the propagation distance increases, the dispersion will increase. A pulse of light having a free space wavelength of $\lambda_0$ will travel in the fiber at a velocity $v=C_0/N$, which is the group velocity, where $N=n-\lambda_0 dn/d\lambda_0$ is the group index. Thus, the pulse will be broadened at the rate $|D_\lambda|\sigma_\lambda$ seconds per unit distance, where $\sigma_\lambda$ is the spectral width of the light, and $D_\lambda=-(\lambda_0/C_0)\, d^2n/d^2\lambda_0$ is a dispersion coefficient.

Alternately, in terms of frequency $\nu$, the dispersion coefficient is $D_\nu=-(\lambda^3_0/C^2_0)\, d^2n/d\lambda_0^2$ since $D_\lambda\, d\lambda=D_\nu\, d\nu$. For pulse propagation in optical fibers, $D_\lambda$ is commonly measured in units of ps/km-nm (picoseconds of temporal spread per kilometer of optical fiber length per nanometer of spectral width), while $D_\nu$ is measured in units of sec/m-Hz. For example, at $\lambda=1,550$ nm, a conventional single-mode optical fiber such as SMF-28™ manufactured by Corning Incorporated of Corning, New York has a $D_\lambda=17$ ps/km-nm. The zero dispersion wavelength of SMF-28™ is 1,310 nm. $\sigma_\lambda$ is measured in units of wavelength broadening per unit spectral width per unit distance (e.g., sec-nm/m).

Furthermore, dispersion can be either normal or anomalous. With normal dispersion ($D_\nu>0$), higher frequency components require a longer travel time than lower frequency components. With anomalous dispersion ($D_\nu<0$), higher frequency components have a shorter travel time. In a typical fiber optics application with infrared light at 1,550 nm, normal dispersion occurs.

There are four sources of dispersion in fiber optical communication systems, namely modal dispersion, material dispersion, waveguide dispersion, and nonlinear dispersion. In a multimode fiber, the index of refraction varies radially. Modal dispersion thus occurs due to the different group velocities $v_q$ of the different modes radially in the fiber. Thus, a single mode light pulse entering a multimode fiber of length L will be spread into M separate pulses which are separated in time by an increment $\tau=L/v_q$, where M is the total number of modes. Consequently, to avoid modal noise, single mode fiber is typically used in CATV applications.

Material dispersion is caused by the wavelength dependency of the index of refraction (n) of the fiber optic material. For example, even though a single-mode fiber has a uniform index of refraction, an optical pulse with different frequency components will experience spectral width spreading in the fiber due to different group velocities $v$ of the spectral components. The temporal width of an optical pulse with spectral width $\sigma_\lambda$ after travelling a distance L in the fiber is related to the dispersion coefficient $D_\lambda$ by $\sigma_\tau=|D_\lambda|\sigma_\lambda L$.

Waveguide dispersion is a function of the relative size of the optical fiber and the wavelength of the transmitted light pulse. Waveguide dispersion is particularly important in single mode fibers, where there is no multimode dispersion, and with $\lambda$ such that material dispersion is relatively small. Since the phase velocities in the core and cladding of the optical fiber are different, the field distribution is a function of the ratio of the core radius to the light pulse wavelength, $a/\lambda_0$. The temporal pulse broadening due to waveguide dispersion is $|D_w|\sigma_\lambda L$, where $D_w$ is a waveguide dispersion coefficient, defined by $D_w=-(1/2\pi C_0)\nu^2\, d^2\beta/D\nu^2$. $\beta$ is the propagation constant of the light pulse, and V is a parameter which is characteristic of the fiber according to $V=2\pi(a/\lambda_o)$ NA, where NA is the numerical aperture of the fiber.

With nonlinear dispersion, the shape of a transmitted light pulse is altered as a function of the intensity I (e.g., amplitude) of the pulse. When the intensity of the light is sufficiently high, the refractive index n becomes intensity-dependent and exhibits nonlinear characteristics. That is, the high-intensity parts of the pulse will exhibit phase shifts which are different from the low-intensity parts, thereby also shifting the frequency of different portions of the pulse by different amounts. Accordingly, the pulse shape is altered.

Specifically, a nonlinear dielectric medium exhibits a nonlinear relationship between the polarization density P and the electric field E of light travelling in the medium, where P and E can be time-varying. In a linear medium, $P=\epsilon_0\chi E$. Nonlinear behavior is caused by changes in the dipole moment p or the number density of dipole moments N, where P=Np. The relationship between p and E is linear when E is small, but becomes nonlinear as E reaches $10^5$ to $10^8$ Volts per meter (V/m), which is comparable to interatomic electric fields. Moreover, the relationship between N and E is nonlinear when the number of atoms in the optical fiber which occupy the energy levels involved in the absorption and emission of light depends on the intensity of the light, as in a laser.

However, since externally applied optical electric fields E are typically weak compared to characteristic interatomic or crystalline fields in an optical fiber, the nonlinearity between polarization P and the electric field E is also relatively weak. That is, if E is small, a Taylor series expansion about E=0 results in the relationship $P=a_1E+\frac{1}{2} a_2E^2+\frac{1}{6} a_3E^3+ \ldots$ , where the coefficients $a_1$, $a_2$, and $a_3$ are the first, second and third derivatives of P with respect to E at E=0. These coefficients are characteristic constants of the optical fiber medium. In particular, $a_1$ is a linear term defined by $a_1=\epsilon_0\chi$, where $\chi$ is the linear susceptibility. $\chi$ is related to the refractive index n by $n^2=\epsilon/\epsilon_0=1=\chi$. $a_2$ represents a second-order nonlinearity, and $a_3$ represents a third-order nonlinearity.

Generally, the second order coefficient $a_2$ indicates second-order harmonic generation in glass fibers doped with, for example, germanium or phosphorus.

Third order nonlinear effects are related to the coefficient $a_3$. Such a medium exhibits a change in refractive index n in proportion to the optical intensity I according to $n(I)=n+n_2I$, where $n_2=a_3\eta_0/8n^2\epsilon_0$, $\eta_0$ is the impedance of free space, and $I=\sqrt{E}$. This effect, known as the optical Kerr effect, is a self-induced effect wherein the phase velocity of the wave varies as a function of the wave intensity. As a result, a wave travelling in a third-order nonlinear media undergoes self-modulation (i.e., self-chirping or self-phase modulation). For example, a light signal with power Pwr and cross-sectional area A, travelling a distance L in the fiber, will exhibit a phase shift of $\phi=2\pi n_2L$ Pwr $/\lambda_0 A$. Thus, the phase shift increases with the optical power Pwr and the length of the fiber link L.

However, the above analysis of nonlinearity must be modified to account for dispersion. A dispersive, nonlinear medium is said to have a memory since the polarization P(t) at time t results from an applied electric field E(t') at time t', where $t' \leq t$. In this case, the coefficients $a_2$ and $a_3$ are not constants, but will depend on the frequency of the light wave travelling in the optical fiber.

In view of the above, there has been a focus on minimizing distortion caused by nonlinear effects in the fiber itself, including, in particular, composite second order (CSO) distortion and self-phase modulation. These distortion components are also a function of the data signal which is carried over the fiber. For example, for an AM-VSB CATV signal, CSO distortion components will be a function of amplitude variations of the signal, cross-channel interference, the number of channels, the carrier frequencies, and other factors. Moreover, in externally modulated transmitters, the CSO is negligible at the transmitter, but increase in the fiber due to overlapping E fields in the optical data signal. By minimizing CSO effects, the distortion introduced by the fiber can be reduced or eliminated.

One solution has been to use electronic compensation to minimize distortion products. That is, the RF modulating signal is modulated with a compensating RF signal before being applied to an optical modulator. This approach is not optimal, however, since the required amount of distortion compensation, or pre-chirping, is a function of fiber dispersion at the source laser operating wavelength, the length of the link fiber, and the detected signal power.

Another approach has been to provide external modulation with single or multi-tone intensity and phase modulation. For instance, a general formula has been derived for CSO distortion that accounts for self-phase modulation, fiber loss, optical amplification and phase modulation. See, e.g., C. Desem, "Composite second order distortion due to self-phase modulation in externally modulated optical AM-SCM systems operating at 1,550 nm," *Electronics Letters*, Nov. 24, 1994, Vol. 30, No. 24, pp. 2055–56; and, M. R. Phillips et al., "Nonlinear Distortion Generated by Dispersive Transmission of Chirped Intensity-Modulated Signals," *IEEE Photonics Technology Letters*, May 1991, Vol. 3, No. 5, pp. 481–83, both of which are incorporated herein by reference.

However, previous approaches do not provide a system which is compatible with existing modulators used in an externally-modulated, feed-forward linearizer. In a feed-forward linearization scheme, an externally modulated fiber-optic link employs a pair of modulators, such as Mach-Zehnder modulators. See J. D. Farna of Photonic Applications, Inc., Bloomfield, Conn., "New Method for Electro-Optic Linearization of External Modulators," *IEEE/ LEOS 1995 Digest of the LEOS Summer Topical Meetings*, Aug. 7–11, 1995.

With feed-forward linearization, a single optical source drives the two modulators, namely a primary modulator in a first arm and an error-correcting modulator in a second arm of the linearizer. A radio-frequency (RF) data signal to be transmitted (e.g., a CATV signal) is applied to the primary modulator. The output of the primary modulator is a composite signal that contains both the fundamentals and the distortion products generated within the modulator. A feed-forward network is employed to compare this composite output signal with the RF data signal. The feed-forward network then generates a corresponding error signal comprising the distortion products which is fed into the error-correcting modulator. The error-correcting modulator provides a corresponding optical error signal which is then provided to an output optical coupler. At the coupler, the distortion products are subtracted from the composite signal to produce a substantially distortion-free transmission signal. The transmitter is thus said to be linearized.

Furthermore, to avoid optical interference at the optical output coupler, the signals in the first (primary) and second (error-correcting) arms of the feed-forward linearizer must be combined incoherently. This can be accomplished by rapidly scrambling the phase of the optical signal in the error-correcting arm at a frequency (e.g., 2 GHz) which is well above the CATV band (e.g., approximately 50 to 550 Mhz for a typical 77-channel system). Thus, in the CATV band, the optical signal in the second arm of the linearizer is effectively depolarized. In particular, a depolarizing phase modulator is provided in the second arm of the linearizer prior to the error-correcting modulator. The depolarizing phase modulator also results in broadening of the linewidth of the optical data signal and, consequently, the reduction of Stimulated Brillouin Scattering (SBS). Moreover, in some feed-forward linearizers, the first arm of the linearizer also includes a phase modulator, but, conventionally, this is not used since there is no need for additional SBS suppression in the first arm of the linearizer.

The feed-forward approach thus, in principle, allows for the correction of all orders of distortion at the transmitter. Accordingly, large intensity optical modulation indexes (OMIs) can be realized. An OMI of 4.5% has been reported for an eighty channel NTSC scheme. In comparison, under similar conditions, the best reported OMI for an electronically linearized system is approximately 3%.

Furthermore, it is known that the CNR of the fiberoptic link is proportional to the square of the intensity OMI. Thus, a large OMI such as that obtainable in the feed-forward linearization approach is highly desirable for long distance communications (e.g., several kilometers). In such an application, the aforementioned EDFAs with an optical power of about 16 dB are typically employed at the transmitter end of the link as a booster amplifier, and at periodic locations in the fiber link as line amplifiers (e.g., every 50 km). In this configuration, system performance is limited by CSO distortion (including self-phase modulation) in the fiber, and by phase modulation of the modulator due to residual chirp. Moreover, while CSO distortion is negligible at the transmitter, it can increase to unacceptably large levels along the fiber. Additionally, CSO distortion becomes worse as the OMI is increased.

Thus, it would be desirable to provide a technique for minimizing CSO distortion in a long distance fiber optic link, while maintaining the OMI at an acceptable level. The technique should be compatible with a feed-forward linearization system, and should reduce or substantially cancel all CSO distortion components in the fiber. Moreover, the technique should be applicable to a fiber optic link where the optical signal is transmitted at a sub-optimal wavelength, i.e., where the transmission wavelength is not the same as the minimum dispersion wavelength of the particular fiber used. The technique should also be compatible with fiber links of varying lengths which carry AM-VSB data signals, and should allow the use of existing commercially available modulation devices.

The present invention provides a method and apparatus for reducing distortion components in an externally-modulated fiber optic link with feed-forward linearization having the above and other advantages.

SUMMARY OF THE INVENTION

In accordance with the present invention, a method and apparatus for reducing fiber-induced composite second order distortion components in an externally-modulated fiber optic link with feed-forward linearization is presented.

The apparatus reduces distortion components in an RF data signal carried in a fiber optic link, where the transmitter of the link comprises a feed-forward linearizer. The linearizer includes a primary modulator in a first optical path, and an error-correcting modulator in a second optical path. The first and second optical paths carry a common coherent optical power signal such as that from a laser. A phase modulator is provided in the first optical path between the optical power source and the primary modulator, and an RF data signal with a phase optical modulation (OMI) index k is used to drive the phase modulator.

The apparatus is particularly adapted for use where the RF data signal is an amplitude-modulated, vestigial sideband (AM-VSB) signal such as that used in CATV transmission, where the data signal is transmitted over the fiber optic link at a carrier wavelength other than the minimum dispersion wavelength of the fiber optic link. For example, the RF data signal may be transmitted at a carrier wavelength of approximately 1,550 nm, where the fiber optic link has a minimum dispersion wavelength of approximately 1,310 nm.

A feed-forward linearizer for reducing distortion components in an RF data signal carried in a fiber optic link is also disclosed. The linearizer receives a coherent optical power signal such as that from a laser. A divider splits the optical power signal into to a first optical path and a second optical path, where there is a primary modulator in the first optical path and an error-correcting modulator in the second optical path. Additionally, a first phase modulator is provided in the first optical path between the divider and the primary modulator, and a second phase modulator is provided in the second optical path between the divider and the error-correcting modulator.

The linearizer further includes a first RF line for providing the RF data signal to the first phase modulator, a second RF line for providing the RF data signal to the primary modulator. A combiner of a feed-forward circuit of the linearizer receives the RF data signal via a third RF line. A detector is located in the linearizer which receives an optical output from the primary modulator, and provides an RF comparison signal from the detector to the combiner over a fourth RF line. At the combiner, an error signal is created and then provided to the error-correcting modulator over a fifth RF line. A sixth RF line provides a depolarizing signal to the second phase modulator. Moreover, an optical output coupler receives a first optical signal from the primary modulator via the first optical path, and a second optical signal from the error-correcting modulator via the second optical path. The coupler then provides a corresponding optical data signal for transmission over the fiber optic link.

A method for reducing distortion components in an RF data signal carried in a fiber optic link comprises providing a coherent optical power signal in a first optical path and a second optical path. The optical power signal in the first path is phase modulated according to a phase OMI k of the RF data signal. The phase-modulated optical power signal in the first optical path is then amplitude-modulated according to an intensity OMI m of the RF data signal. The optical power signal in the second optical path is depolarized, and the depolarized optical power signal in the second optical path is amplitude-modulated in response to a feed-forward linearization error signal. Next, the amplitude-modulated and phasemodulated optical power signal of the first optical path is combined with the depolarized and amplitude-modulated optical power signal in the second optical path to provide an optical data signal for transmission over the fiber optic link.

DESCRIPTION OF THE PREFERRED EMBODIMENTS

The present invention relates to a method and apparatus for reducing fiber-induced composite second order distortion components in a fiber optic link, where the link is driven with an externally modulated, feed-forward linearization configuration.

Figure 1:
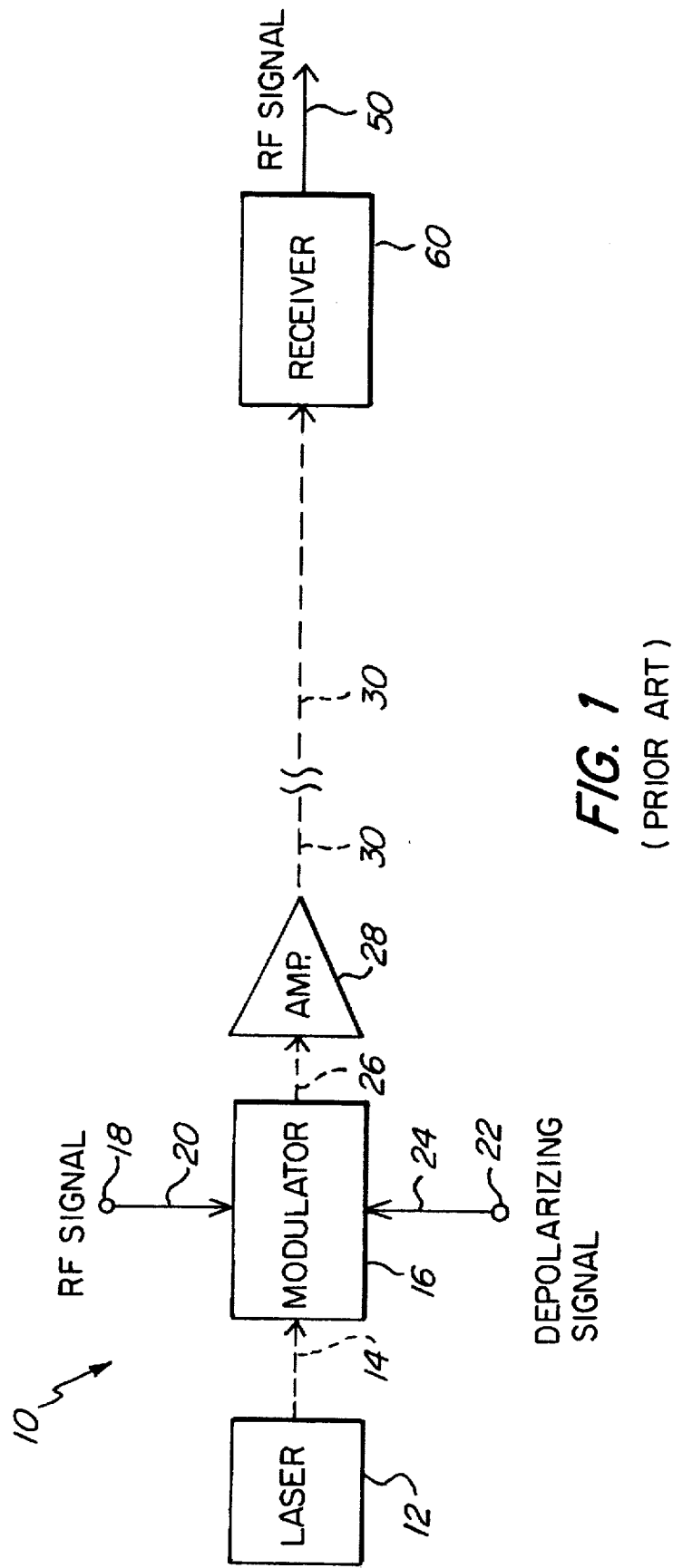
FIG. 1 is block diagram of a conventional fiber optic communication link.

FIG. 1 is block diagram of a conventional fiber optic communication link. A transmitter, shown generally at 10, transmits an RF data signal to a receiver 60 over an optical fiber path 30. The transmitter 10 includes a laser 12, which is typically a continuous wave device such as a distributed feedback (DFB) laser or a Fabry-Perot laser that lases, for example, at λ=1,550 nm. Coherent radiation from the laser is provided to a modulator 16 via optical path 14. The modulator 16 may comprise a single modulator such as a Mach-Zehnder modulator, or may comprise more than one modulator such as in a feed-forward linearizer. The modulator 16 also receives, via terminal 18 and line 20, an RF data signal such as an amplitude modulated vestigial sideband (AM-VSB) cable television (CATV) data signal. Moreover, when a feed-forward linearizer is used, a depolarizing signal is provided to the modulator 16 via terminal 22 and line 24. The depolarizing signal is used to depolarize the optical input to an error-correcting modulator (not shown) in the modulator 16.

An optical data signal which carries the RF data signal is provided via line 26 to an amplifier 28. The amplifier 28 may be, for example, an erbium doped fiber amplifier (EDFA). The amplified optical data signal is provided via optical path 30 to the receiver 60. The optical fiber transmission path 30 may be a long-distance path extending over several kilometers. In this case, line amplifiers such as EDFA 28 may be provided periodically in the line in order to boost the signal to desired levels. At the receiver 60, an amplifier (not shown) may be provided to boost the incoming optical signal if required. The boosted signal is then demodulated at the receiver 60 to recover the RF data signal at line 50.

Figure 2:
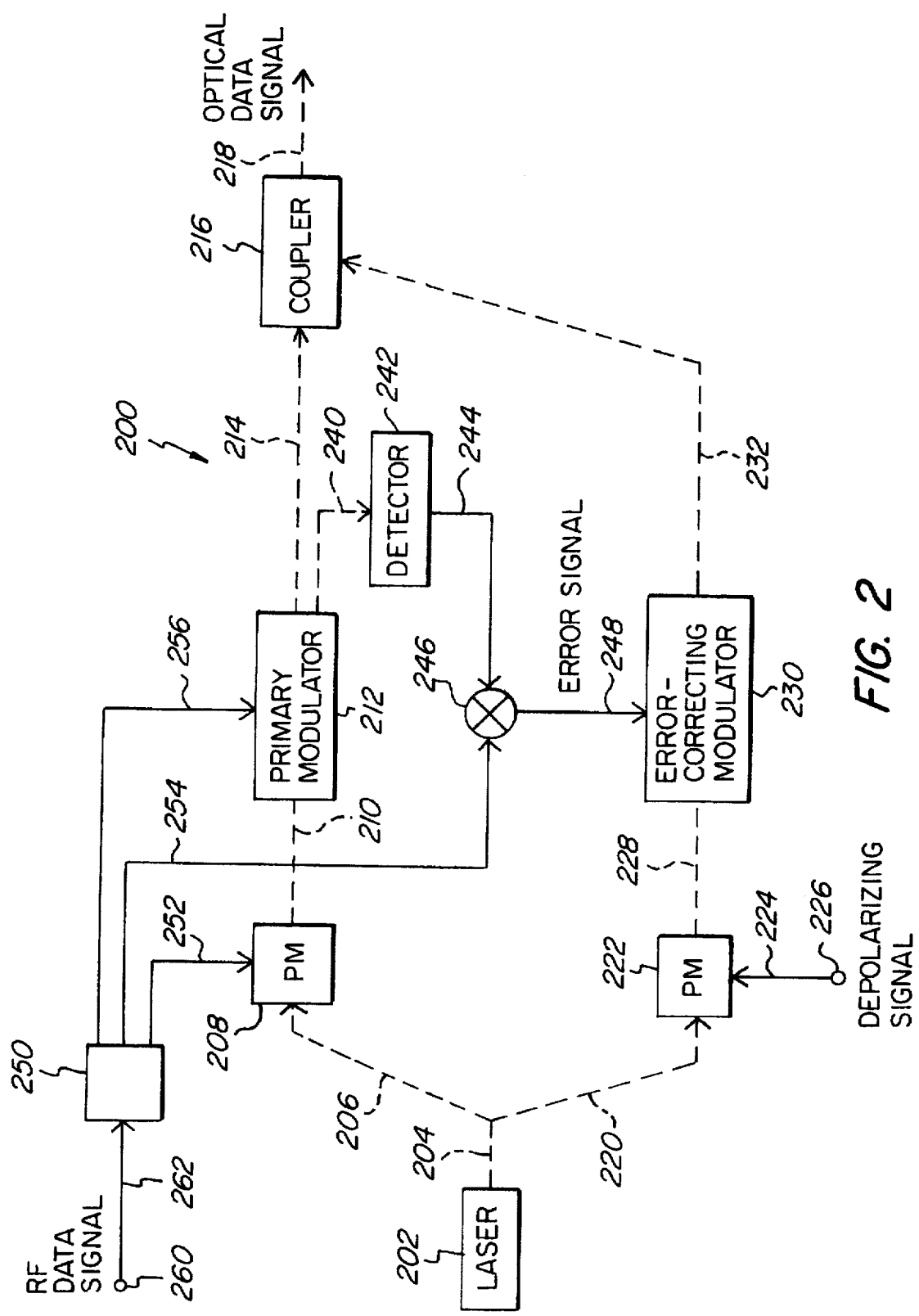
FIG. 2 is block diagram of a feed-forward linearizer in accordance with the present invention.

FIG. 2 is block diagram of a feed-forward linearizer in accordance with the present invention. Solid lines indicate an RF signal is carried, while dashed lines indicate an optical path. The linearizer, shown generally at 200, includes a continuous wave laser 202 which produces an optical carrier at a wavelength λ. The laser 202 may comprise, for example, a rare earth laser, such as an Erbium laser, which lases at λ=1,550 nm. Furthermore, the laser may be of the Fabry-Perot, Distributed Feedback (DFB), Distributed Bragg Reflector (DBR), or other known variety.

The laser 202 provides an optical carrier on optical path 204, which communicates with a first optical path 206 and a second optical path 220 via, for example, an optical divider or coupler (not shown). In accordance with the present invention, a phase modulator (PM) 208 receives the optical signal on path 206. The phase modulator 208 also receives an RF data signal, such as an AM-VSB CATV signal, from a splitter 250 via line 252. However, the entire spectrum of the RF data signal, which may include frequency components from 50 to 550 MHz, for example, need not be provided on line 252. A filter may be provided in the splitter 250 or on line 252 that passes only a portion of the RF data signal. In particular, the upper portion of the RF data signal spectrum may be provided to the phase modulator 208 to reduce CSO distortion in the corresponding upper bands of the transmitted optical data signal at line 218. In fact, as discussed below, CSO distortion is more prevalent at higher carrier frequencies.

The PM 208 adjusts the phase of the optical signal received via optical path 206 in accordance with a phase optical modulation index (OMI), k, of the RF data signal in order to cancel or reduce CSO distortion components which will be introduced into the optical data signal which is carried over optical path 218. Furthermore, once the desired phase OMI k is determined, the RF data signal provided to the phase modulator 208 via line 252 may be pre-conditioned by adjusting its phase and amplitude. Accordingly, phase and amplitude adjusting means (not shown) may also be provided on line 252 for adjusting the phase and amplitude, respectively, of the RF data signal that is input to the PM 208. The phase-modulator 208 thus provides a phase modulated, or pre-chirped, optical signal to the primary modulator 212 via optical path 210.

The RF data signal is also provided to the primary modulator 212, via line 256. The primary modulator 212 modulates the optical signal from path 210 in accordance with an intensity OMI, m, of the RF data signal, and provides an intensity (e.g., amplitude) modulated optical signal via optical paths 214 and 240. The signal on paths 214 and 240 is a composite signal that includes both the fundamentals and the distortion products generated within the primary modulator 212. The composite signal of path 214 is provided to an optical output coupler 216, while the composite signal of path 240 is provided to a detector 242.

The detector 242 converts the composite optical signal of path 240 into a corresponding RF signal on line 244 for comparison with the RF data signal provided on line 254. A combiner 246 receives the two RF signals and provides an error signal to an error-correcting modulator 230 via line 248. Thus, a feed-forward network is described. Commonly, the feed-forward error signal on line 248 is boosted using an amplifier (not shown).

The error-correcting modulator 230 intensity-modulates an optical signal received via path 228 to provide the optical signal of path 232 to the coupler 216. The coupler 216 then outputs an optical data signal for transmission at path 218, which may comprise an optical fiber. The optical fiber 218 is preferably a single-mode fiber such as SMF-28™ manufactured by Corning Incorporated. Note that the optical error-correcting signal of path 232 is typically much smaller in amplitude compared to the fundamental signal of path 214, so it is reasonable to assume the error-correcting signal does not experience a significant fiber-induced distortion. Pre-chirping of the error signal is therefore probably unnecessary for link lengths up to one hundred kilometers, but may be desirable for longer link lengths.

The optical signal of path 228 is generated from the optical signal of path 220, which is modulated by a phase modulator 222. The phase modulator 222 receives an RF depolarizing signal via terminal 226 and line 224. The depolarizing signal is an out-of-band signal, such as a single tone, that rapidly scrambles the phase of the optical signal of path 220 at a frequency (e.g., 2 GHz) which is well above the CATV band. Thus, within the CATV band (e.g., 50 to 550 MHz), the optical signal of path 228 is effectively depolarized. The phase modulator 222 also broadens the linewidth of the optical signal to reduce Stimulated Brillouin Scattering (SBS).

Accordingly, the optical signals of paths 232 and 214 will be incoherent relative to one another. Generally, since the same optical source drives both the primary modulator 212 and the error-correcting modulator 230, the relative coherence of the two signals at the coupler 216 is crucial to the operation of the feed-forward linearizer. To avoid optical interference at the coupler 216, the signals in the primary and error-correcting arms of the linearizer must therefore be combined incoherently.

Furthermore, assuming that both the primary modulator 212 and the error-correcting modulator 230 are biased at quadrature, the even order distortion components introduced in the transmitted signal at path 218 will be essentially negligible. Thus, the distortion introduced by the primary modulator 212 and compensated for by the error-correcting modulator 230 is predominantly of odd order. The feed-forward approach, in principle, allows for the correction of all orders of distortion, thereby allowing relatively large intensity OMIs, m, to be used in the RF data signal of line 256.

However, in such applications, especially when the optical signal is at $\lambda=1,550$ nm, the performance of the fiber optic link is degraded by dispersion and self-phase modulation in the fiber. This is in addition to the phase modulation introduced by the primary modulator 212 due to its own residual chirp. When a phase modulated optical signal travels along a dispersive medium, such as an optical fiber, composite second order distortions (CSOs) are introduced at a level which is unacceptable for most CATV applications. Thus, although the CSO at the transmitter end of the link is negligible, fiber-induced CSO could be unacceptably large. Moreover, recent studies have shown that this problem is worsened as the intensity OMI increases. Hence, a large intensity OMI may not be very desirable. In long distance applications, therefore, fiber-induced CSO must be compensated. In accordance with the present invention, the RF data signal-driven phase modulator 208 provides this required compensation.

Moreover, the present invention provides an implementation that is compatible with commercially available external modulators such as, for instance, the Model m2420C Dual-Output Lithium Niobate Modulator, available from AT&T Microelectronics of Breinigsville, Pa. The Model m2420C modulator may be employed in the first optical path 206 of the linearizer 200. It includes two SMA connectors, the first of which is conventionally used as a DC bias input, while the second is an RF signal input. In accordance with the present invention, the DC bias input is used instead for phase modulation, while the RF signal input receives an RF data signal.

Moreover, the second optical path 220 of the linearizer 200 can use, for instance, the APE™ Dual Output Modulator for CATV Transmitters, available from United Technologies Photonics of Bloomfield, Conn. The APE includes a DC bias input, an RF signal input, a phase modulation input, and an optional photodetector output. The phase modulator is thus integral with the device, and is used conventionally for depolarization and SBS suppression as discussed above.

Figure 3A:
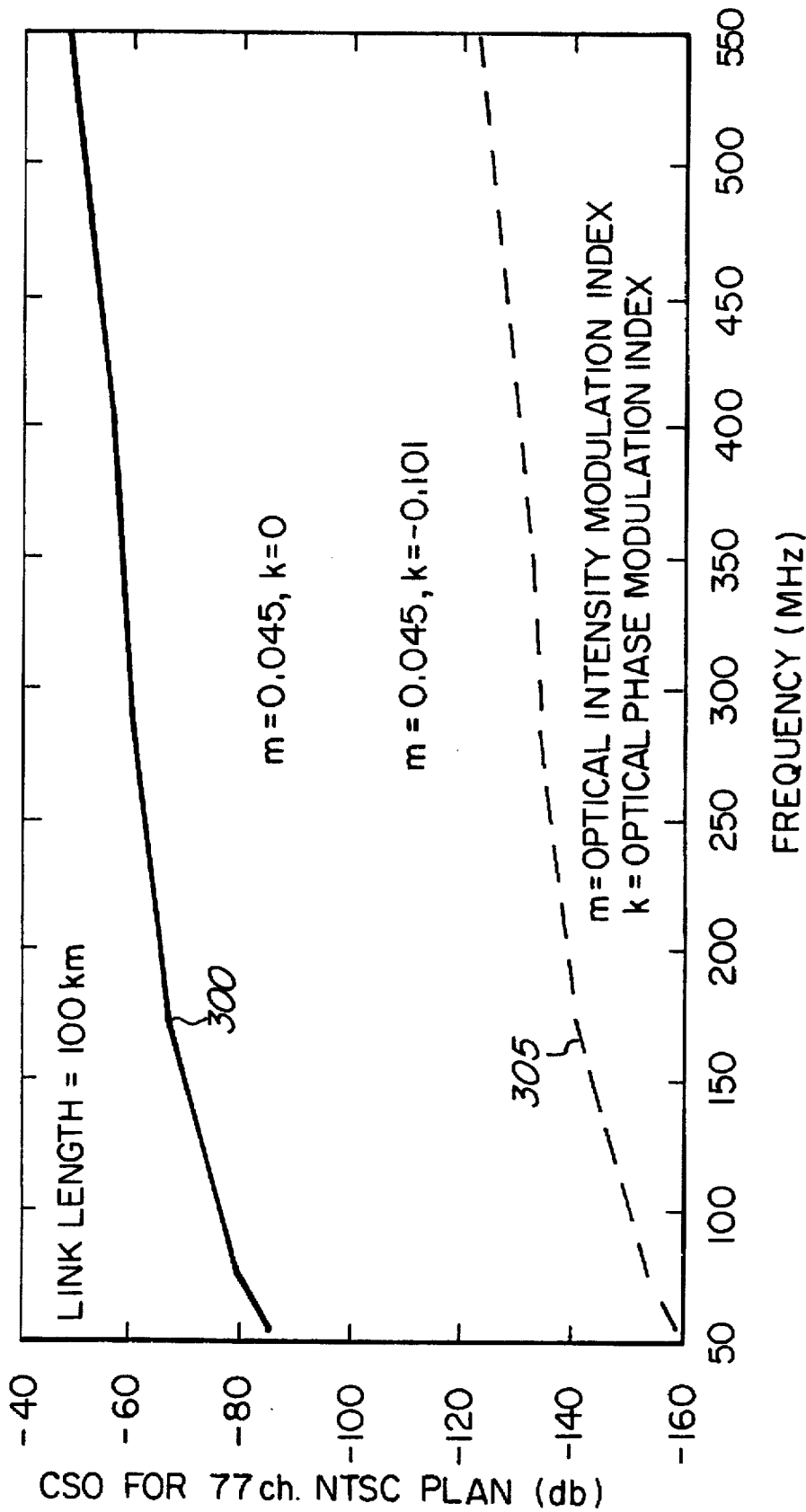
FIG. 3a is graph showing the reduction in composite second order (CSO) distortion as a function of frequency in accordance with the present invention.

FIG. 3a is graph showing the reduction in CSO distortion as a function of frequency in accordance with the present invention. Fiber-induced CSO is shown as a function of RF data signal frequency with and without phase modulation (pre-chirping) of the external modulator in a feed-forward linearizer. A seventy-seven channel NTSC plan is assumed. A fiber optic link length of one hundred kilometers was also assumed, with an intensity OMI, m, of 4.5%. The solid, upper line 300 corresponds to the case with k=0 (no phase modulation), and the lower, dashed line 305 correspond to the case with a phase OMI k=-0.101.

As shown, the CSO distortion increases with frequency. This is due to the fact that in the frequency domain, the upper channels are farthest from the optical carrier and therefore cause greater dispersion. Thus, it would be sufficient in many cases to pre-chirp just the higher frequency channels, for example, from 300 to 550 MHz. In this case, CSO distortion would remain under −60 dB. Advantageously, this would also ease the phase balance requirement of the RF signal input to the PM 208 of FIG. 2. In the actual implementation of pre-chirping, a filter (not shown) could be employed on line 252 of FIG. 2 to pass the channels to be pre-chirped before providing the resulting signal to an amplifier (not shown) and then to the PM 208. The provision of a filter would also ease the linearity requirement of the amplifier.

Figure 3B:
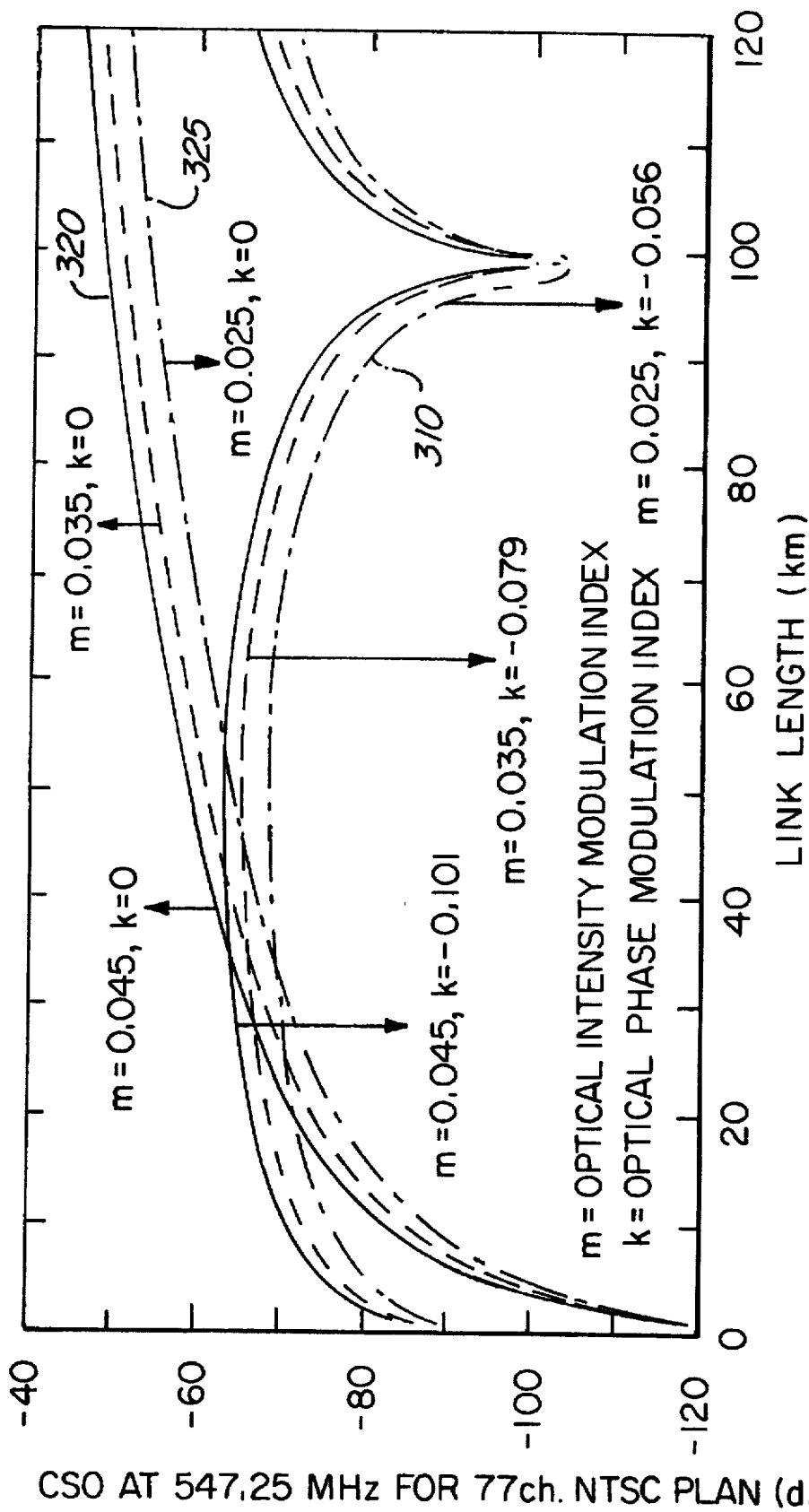
FIG. 3b is graph showing the reduction in composite second order (CSO) distortion for a link length of 100 km in accordance with the present invention.

FIG. 3b is graph showing the reduction in composite second order (CSO) distortion for a link length of L=100 km in accordance with the present invention. For an RF CATV signal at 547.25 MHz, various combinations of intensity OMI, m, and phase OMI, k, were considered. As shown at line 310, with m=0.025 (e.g., 2.5%), and k=-0.056 (e.g., -5.6%), CSO is minimized for a link length of 100 km.

Furthermore, it can be seen that, without optical phase modulation in accordance with the present invention, large reductions in the intensity OMI, m, do not significantly reduce CSO distortion. For example, at L=100 km, with k=0, m=0.045 yields a CSO distortion of approximately −50 dB (line 320), while k=0, m=0.025 yields a CSO distortion of approximately −55 dB (line 325). The improvement is therefore only about 5 dB. Now, with m=0.025 and k=-0.056 (line 310), the CSO distortion is approximately −105 dB, resulting in an improvement of about 50 dB relative to the m=0.025, k=0 case.

Figure 3C:
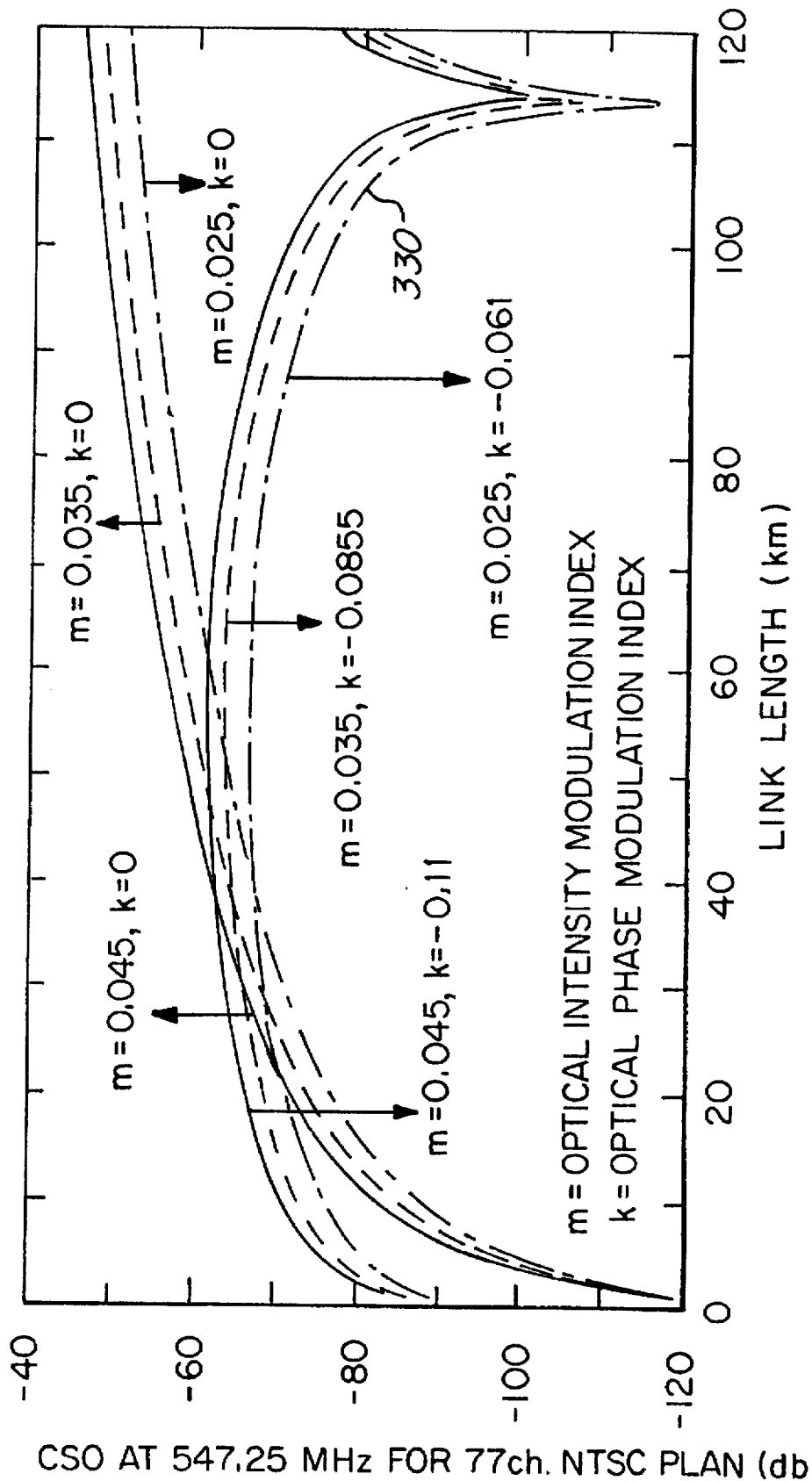
FIG. 3c is a graph showing the reduction in composite second order (CSO) distortion for a link length of 115 km in accordance with the present invention.

FIG. 3c is graph showing the reduction in composite second order (CSO) distortion for a link length of 115 km in accordance with the present invention. For an RF CATV signal at 547.25 MHz, CSO is minimized for a link length of 100 km with m=0.025, and k=-0.061 (line 330).

Generally, the optical phase and intensity modulation indexes, k and m, can be varied experimentally to arrive at an optimum solution. Detection and measuring equipment can be employed at the receiving end of the link to determine the effectiveness of various scenarios. For example, it may be desirable to determine k as a function of RF data carrier frequency (e.g., k=k(f)) to obtain an approximately constant CSO distortion for a given value of m.

As can be seen, the present invention provides a technique for reducing CSO distortion in an externally-modulated feed-forward linearizer of a fiber optic link. In particular, the technique allows use of commercially available modulators to achieve this result, and compensates for fiber dispersion caused by operation at a wavelength other than the optimal wavelength for which the fiber is designed. In fact, CSO distortion levels would otherwise reach unacceptably high levels when an optical data signal is transmitted using a relatively large intensity optical modulation index over a long-distance fiber optic link.

Although the invention has been described in connection with various specific embodiments, those skilled in the art will appreciate that numerous adaptations and modifications may be made thereto without departing from the spirit and scope of the invention as set forth in the claims.

I claim:

1. Apparatus for reducing distortion components in an RF data signal carried as an optical data signal in a fiber optic link, wherein said link comprises feed-forward linearization means including a primary modulator in a first optical path, and an error-correcting modulator in a second optical path, said first and second optical paths carrying a common coherent optical power signal which is provided by an optical power source, said apparatus comprising:

a phase modulator provided in said first optical path between said optical power source and said primary modulator;

first means including a first RF line for providing said RF data signal to said phase modulator, such that said phase modulator is responsive to a phase optical modulation index (OMI) k of said RF data signal for modulating the intensity of said optical power signal.

2. The apparatus of claim 1 further comprising:

second means including a second RF line for providing said RF data signal to said primary modulator, such that said primary modulator is responsive to an intensity OMI m of said RF data signal for modulating the intensity of said optical power signal.

3. The apparatus of claim 2, wherein said phase OMI k is adjusted based on the length of said fiber optic link and said intensity OMI m.

4. The apparatus of claim 1, further comprising:

a filter coupled to said first RF line for filtering said RF data signal to provide components from an upper portion of the frequency spectrum of said RF data signal to said phase modulator.

5. The apparatus of claim 1, further comprising:

a phase adjuster coupled to said first RF line for adjusting the phase of said RF data signal provided to said phase modulator; and an amplitude adjuster coupled to said first RF line for adjusting the amplitude of said RF data signal provided to said phase modulator.

6. The apparatus of claim 1, wherein said optical data signal is transmitted at a carrier wavelength of approximately 1,550 nm, and said fiber optic link has a minimum dispersion wavelength of approximately 1,310 nm.

7. The apparatus of claim 1, wherein said distortion components are composite second order (CSO) distortion components.

8. A feed-forward linearizer for reducing distortion components in an RF data signal carried as an optical data signal in a fiber optic link, comprising:

input means for receiving a coherent optical power signal;

a divider for providing said optical power to a first optical path and a second optical path;

a primary modulator in said first optical path;

an error-correcting modulator in said second optical path;

a first phase modulator provided in said first optical path between said divider and said primary modulator;

a second phase modulator provided in said second optical path between said divider and said error-correcting modulator;

a first RF line for providing said RF data signal to said first phase modulator;

a second RF line for providing said RF data signal to said primary modulator;

a third RF line for providing said RF data signal to a combiner of a feed-forward circuit of said linearizer;

a fourth RF line for providing an RF comparison signal from a detector responsive to an optical output of said primary modulator to said combiner;

a fifth RF line for providing an error signal from said combiner to said error-correcting modulator;

a sixth RF line for providing a depolarizing signal to said second phase modulator; and an optical output coupler for receiving a first optical signal from said primary modulator via said first optical path, and for receiving a second optical signal from said error-correcting modulator via said second optical path, to provide said optical data signal for transmission over said fiber optic link.

9. The apparatus of claim 8, further comprising:

a filter coupled to said first RF line for filtering said RF data signal to provide components from an upper portion of the frequency spectrum of said RF data signal to said first phase modulator.

10. The apparatus of claim 8, further comprising:

a phase adjuster coupled to said first RF line for adjusting the phase of said RF data signal provided to said first phase modulator; and an amplitude adjuster coupled to said first RF line for adjusting the amplitude of said RF data signal provided to said first phase modulator.

11. The apparatus of claim 8, wherein said optical data signal is transmitted at a carrier wavelength of approximately 1,550 nm, and said fiber optic link has a minimum dispersion wavelength of approximately 1,310 nm.

12. The apparatus of claim 8, wherein said distortion components are composite second order (CSO) distortion components.

13. A method for reducing distortion components in an RF data signal carried in a fiber optic link, comprising the steps of:

providing a coherent optical power signal in a first optical path and a second optical path;

phase modulating said optical power signal in said first path according to a phase optical modulation index (OMI) k of said RF data signal;

intensity-modulating said phase-modulated optical power signal in said first optical path according to an intensity OMI m of said RF data signal;

depolarizing said optical power signal in said second optical path;

intensity-modulating said depolarized optical power signal in said second optical path in response to a feed-forward linearization error signal;

combining said intensity-modulated and phase-modulated optical power signal of said first optical path with said depolarized and intensity-modulated optical power signal in said second optical path to provide an optical data signal for transmission over said fiber optic link.

14. The method of claim 13, wherein said phase OMI k is adjusted based on the length of said fiber optic link and said intensity OMI m.

15. The method of claim 13, comprising the further step of:

filtering said RF data signal of said phase modulating step to provide components from an upper portion of the frequency spectrum of said RF data signal for said phase modulating.

16. The method of claim 13, comprising the further step of:

phase adjusting said RF data signal of said phase modulating step.

17. The method of claim 13, comprising the further step of:

amplitude adjusting said RF data signal of said phase modulating step.

18. The method of claim 13, wherein said optical data signal is transmitted at a carrier wavelength of approximately 1,550 nm, and said fiber optic link has a minimum dispersion wavelength of approximately 1,310 nm.

19. The method of claim 13, wherein said distortion components are composite second order (CSO) distortion components.

* * * * *

UNITED STATES PATENT AND TRADEMARK OFFICE
CERTIFICATE OF CORRECTION

PATENT NO. : 5,699,179
DATED : Dec. 16, 1997
INVENTOR(S) : Gopalakrishnan

It is certified that error appears in the above-identified patent and that said Letters Patent is hereby corrected as shown below:

Column 2, line 15: "$d^2n/d^2\lambda_0$" is changed to --$d^2n/d\lambda^2_0$--.

Column 3, line 38: "$1=\chi$" is changed to --$1+\chi$--.

Column 4, line 9: "increase" is changed to --increases--.

Column 6, line 21: "to" is deleted.

Column 6, line 47: After "comprises", --the step of-- is inserted.

Column 11, line 20: "intensity" is changed to --phase--.

Signed and Sealed this

First Day of September, 1998

*Attest:*

BRUCE LEHMAN

*Attesting Officer*   *Commissioner of Patents and Trademarks*